United States Patent
Spagnoli et al.

(10) Patent No.: US 9,688,012 B2
(45) Date of Patent: Jun. 27, 2017

(54) BLOW MOLD ASSEMBLY

(71) Applicant: Milacron LLC, Batavia, OH (US)

(72) Inventors: Robert Anthony Spagnoli, Cement City, MI (US); Robert L. Padley, Brooklyn, MI (US); Christopher Brian Isaac, Clarkston, MI (US)

(73) Assignee: Milacron LLC, Cincinnati, OH (US)

( * ) Notice: Subject to any disclaimer, the term of this patent is extended or adjusted under 35 U.S.C. 154(b) by 0 days.

(21) Appl. No.: 14/874,494

(22) Filed: Oct. 5, 2015

(65) Prior Publication Data

US 2017/0095964 A1 Apr. 6, 2017

(51) Int. Cl.
 *B29C 49/48* (2006.01)
 *B29C 49/50* (2006.01)
 B29C 49/56 (2006.01)
 B29L 31/00 (2006.01)

(52) U.S. Cl.
 CPC .......... *B29C 49/48* (2013.01); *B29C 49/4817* (2013.01); *B29C 49/50* (2013.01); *B29C 2049/4861* (2013.01); *B29C 2049/563* (2013.01); *B29L 2031/712* (2013.01)

(58) Field of Classification Search
 CPC ........ B29C 2049/4861; B29C 49/4817; B29C 49/48; B29C 49/50
 See application file for complete search history.

(56) References Cited

U.S. PATENT DOCUMENTS

| | | | | |
|---|---|---|---|---|
| 4,032,278 A | * | 6/1977 | Kuenzig | B29C 49/48 425/525 |
| 5,894,024 A | * | 4/1999 | Lambarth | B29C 49/50 425/525 |
| 6,648,623 B2 | | 11/2003 | Petre | |
| 6,966,764 B2 | * | 11/2005 | Wohlgemuth | B29C 49/78 425/168 |
| 7,335,007 B2 | | 2/2008 | Perez et al. | |
| 7,713,055 B2 | | 5/2010 | Janeczek | |
| 8,770,961 B2 | * | 7/2014 | Duclos | B29C 33/305 425/195 |
| 2014/0017353 A1 | * | 1/2014 | Zoppas | B29C 49/48 425/541 |

OTHER PUBLICATIONS

International Search Report and Written Opinion, PCT/US16/55295, Nov. 3, 2016.

* cited by examiner

*Primary Examiner* — Robert B Davis
(74) *Attorney, Agent, or Firm* — Medler Ferro Woodhouse & Mills PLLC

(57) ABSTRACT

A blow mold assembly comprises removable neck insert mold components for forming features of a container for engaging a removable container closure and manually operable retention devices for releasably retaining the neck insert mold components with mating mold components of the mold assembly. Advantageously, each manually operable retention device comprises a clamp mechanism comprising a lever arm and clamp arm arranged so that the clamp arm is rotated between a release position and a clamp position by manual operation of the lever arm and the clamp mechanism is effective to resist forces acting on the clamp arm to rotate the clamp arm to the release position when the clamp arm is in the clamp position. Each manually operable retention device is retained with an associated mating mold component when a neck insert mold component is removed from or installed to the mold assembly.

10 Claims, 4 Drawing Sheets

BLOW MOLD ASSEMBLY

I. BACKGROUND OF THE INVENTION

Field of the Invention

This invention relates generally to blow molded containers. In particular, this invention relates to mold assemblies wherein the so-called "neck finish" (surface feature for engaging a container closure) is formed in the blow molding process.

Description of Related Art

Blow molding is a cyclic process wherein a hollow tubular preform of material in a moldable condition is centered on the parting plane of a mold assembly, the mold assembly is closed around the preform, the preform is expanded so the exterior of the preform abuts molding surfaces defined by the closed mold assembly, the blow molded article is conditioned to be sufficiently rigid to retain its size and shape while unsupported, the mold assembly is opened and the blow molded article is removed. In general, the moldable condition of the preform is achieved when the material of the preform is at an elevated temperature, and the rigid condition of the blow molded article is achieved when the temperature of the material has been reduced. A blow molding machine comprises a press for opening and closing the mold assembly and pressurizing apparatus for introducing a pressurized fluid (typically air) to expand the preform in the closed mold assembly. One type of blow molding equipment produces blow molded containers from tubular extrusions produced by extruding equipment arranged relative a molding assembly to position one or more extrusions in the parting plane of the mold assembly. A substantially tubular extrusion extends below the lower end of a cavity defined by mating mold members and, with abutment of the mating mold members, the lower extremity of the extrusion is closed leaving the upper end of the extrusion open so as to create a blow moldable preform.

Blow molding is commonly used for production of containers for transporting, storing and dispensing liquids wherein the blow molded article comprises a body portion and a neck connecting the container body with a mouth opening for filling the container and dispensing the contents therefrom. Advantageously, the neck portion of the container comprises an exterior surface having one or more features, referred to herein as the "neck finish", for engaging a separable closure for covering the mouth opening. Known neck finish features include: (i) screw type threads for engaging mating threads on a shank of a closure; and, (ii) at least one protruding circumferential ring, such as a so-called "snap ring" for engaging compatible features in a shank of a closure to resist detachment of the closure from the neck finish. Mold assemblies for blow molding containers comprise mating mold components wherein molding surfaces open to the mating faces of the mold components define the exterior of the container. Advantageously, mold assemblies comprise replaceable insert components for forming the neck portion, wherein the neck insert mold components define the exterior surface of at least the neck finish. Use of replaceable neck insert mold components facilitates production of containers that differ only in the neck finish as well as replacement of inserts that become worn or otherwise degraded through use.

Known constructions of mold assemblies with replaceable neck insert mold components retain those insert components in the mold assemblies with fasteners that require use of tools for removal and installation of the neck insert mold components. Consequently, the time required to replace neck insert mold components is impacted by the time required to remove and install fasteners retaining a neck insert mold component. Under circumstances where container production is interrupted solely for changing from containers accepting one closure type to containers accepting a different closure type, time for replacement of neck finish inserts is a component of lost production time. Hence, there is a need to provide neck insert mold components and retaining devices therefore that reduce the time required for neck insert mold component replacement in mold assemblies.

II. SUMMARY OF THE INVENTION

It is an object of the present invention to provide a blow mold assembly for blow molding containers, each container having a neck portion for engaging a removable container closure, the blow mold assembly comprising opposed mating mold components for forming exterior surfaces of at least one container, each mating mold component comprising a removable neck insert mold component for forming closure engaging features on the exterior of a portion of a container neck; and, at least one manually operable retention device for retaining the neck insert mold component with a mating mold component of the blow mold assembly.

It is a further object of the present invention to provide a mold assembly for extrusion blow molding of a container having a neck portion for engaging a removable container closure, the blow mold assembly comprising removable neck insert mold components for forming at least the container closure engaging features of the container neck wherein each removable neck insert mold component comprises (i) a neck finish member for forming, at least in part, the exterior surface of the portion of the container that engages a removable container closure; (ii) a shear member for parting a tubular parison so as to define a perform below the shear member; and, the mold assembly comprises at least one manually operable retention device for retaining the neck insert mold component with a mating mold component of the blow mold assembly.

Further objects and advantages of the invention shall be made apparent from the accompanying drawings and the following description thereof.

In accordance with the aforesaid objects the present invention provides a blow mold assembly for blow molding a container having a neck portion for engaging a removable container closure, the blow mold assembly comprising opposed mating mold components for forming the container wherein each mating mold component comprises a removable neck insert mold component for forming the container closure engaging features of the container neck and at least one manually operable retention device for retaining the neck insert mold component with a mating mold component of the blow mold assembly. Advantageously, the container is blow molded from a preform produced from an extruded tubular parison and each neck insert mold component comprises a shear member for parting the tubular parison to define the perform from the portion of the parison below the shear member, a neck finish member for forming the container closure engaging features on the perform and a plurality of pins for aligning the shear member with the neck finish member. Further, each manually operable retention device comprises a toggle mechanism comprising a clamp arm for contacting a neck insert mold component and a lever arm, the clamp arm being rotated between a release position and a clamp position by operation of the lever arm and with the clamp arm in the clamp position, the toggle mechanism effective to resist forces acting on the clamp arm to rotate the clamp arm toward the release position. Still further, the manually operable retention devices are retained with the mating mold component when the neck insert mold component is removed or installed

III. BRIEF DESCRIPTION OF THE DRAWINGS

IV. DETAILED DESCRIPTION OF THE PREFERRED EMBODIMENT

The invention shall be illustrated with reference to a preferred embodiment which shall be described in detail. It is not the intention of applicants that the invention be limited to the preferred embodiment, but rather that the invention shall be defined by the appended claims and all equivalents thereof. As used in this description and the accompanying claims, "manually operable" refers to operation by hand without use of tools.

Figure 1:
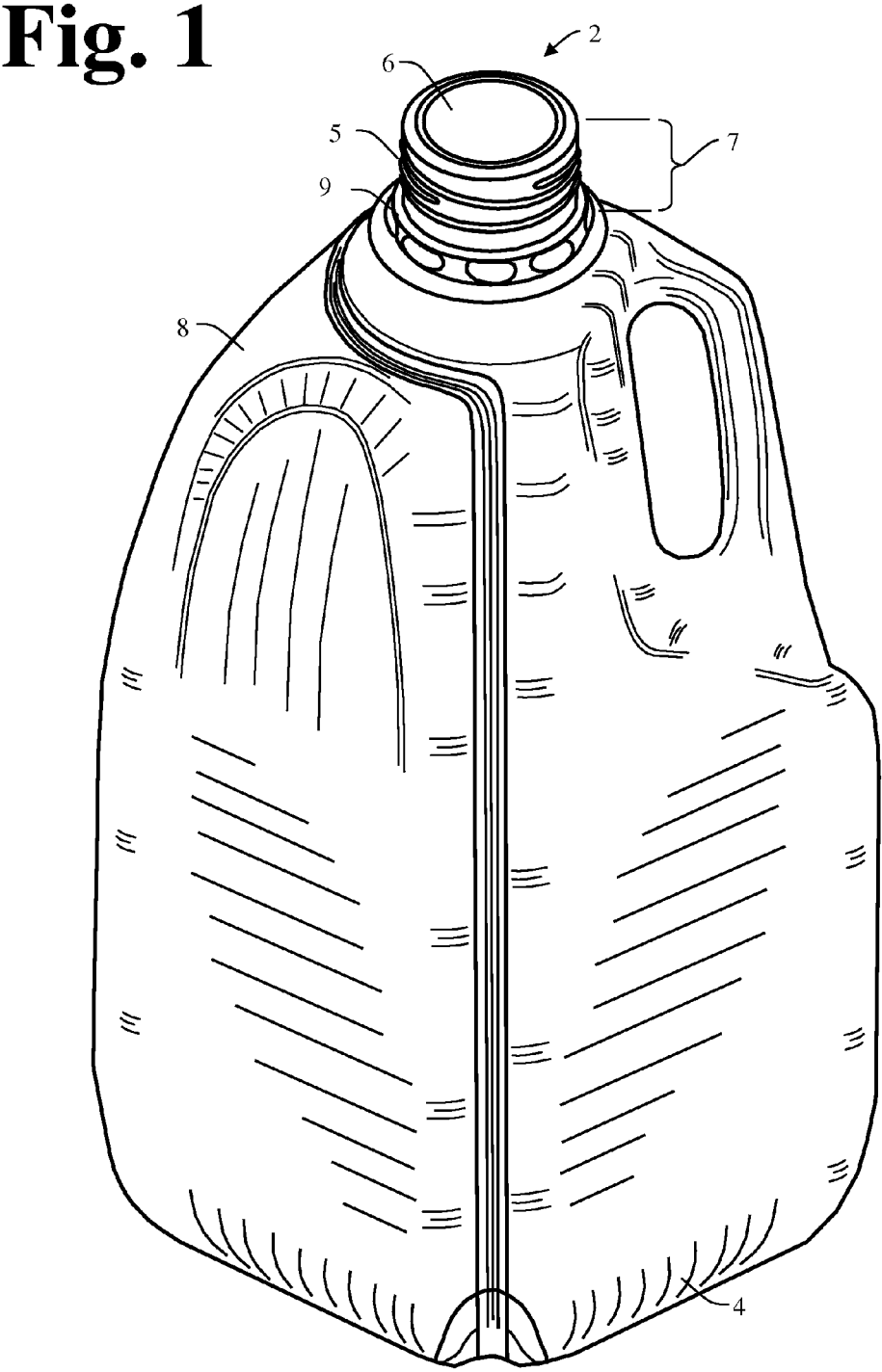
FIG. 1 illustrates a blow molded container with a neck finish.

Referring to FIG. 1, container 2 comprises a closed end at base 4 and a mouth opening 6 joined to hollow body 8 by neck 7. Neck 7 comprises neck finish 5 shown as a thread flight for engaging a closure (not shown) for covering mouth opening 6. As shown in FIG. 1, bumper roll 9 is interposed between neck finish 5 and body 8 and serves to improve resistance to deformation of the body 8 in consequence of compressive forces applied vertically to neck 7 when the container is filled and/or a closure is applied.

Figure 2:
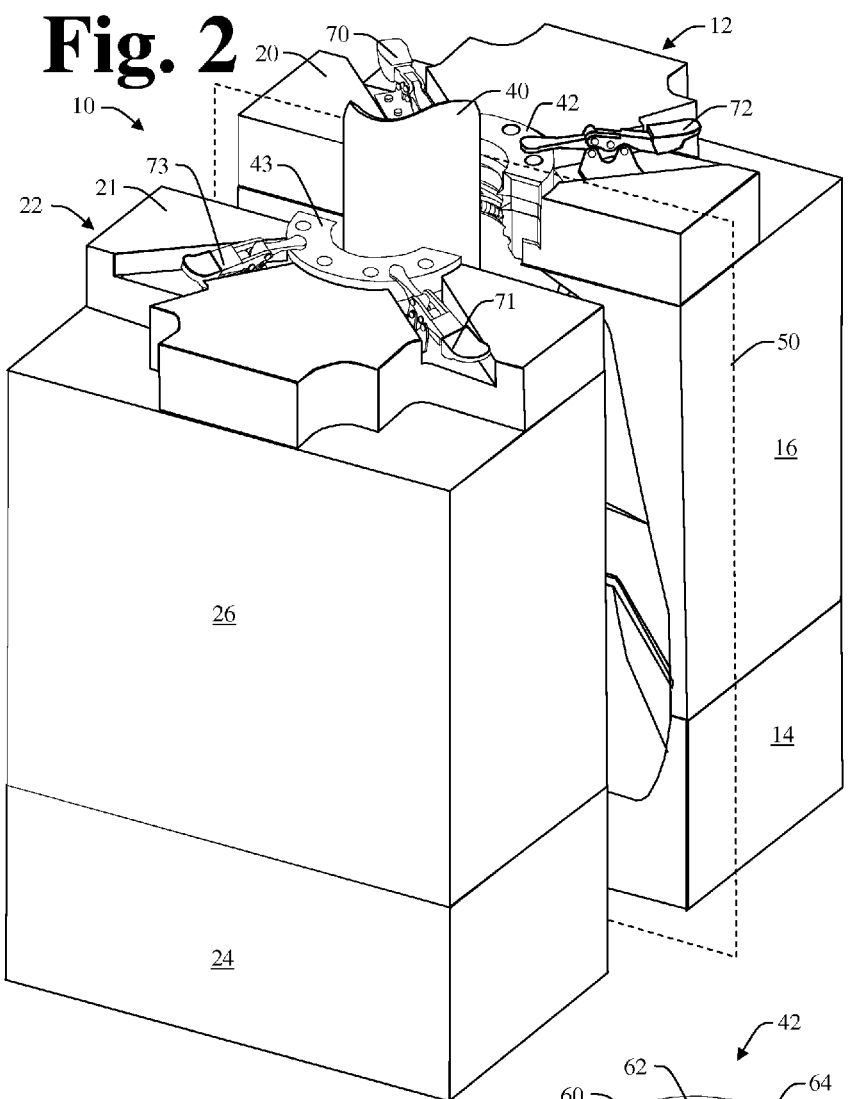
FIG. 2 illustrates a blow mold assembly for blow molding a container such as the container of FIG. 1.

Referring to FIG. 2, mold assembly 10 comprises opposed mating mold components 12 and 22 each referred to herein as a "mold half", "mating mold half" or "mating mold component". Each of mold components 12 and 22 is carried by a member of a molding machine press (not shown) for translating the mold components between open and closed positions relative to each other (the open position depicted in FIG. 2). In the open position, mating mold components 12 and 22 are separated permitting admission of a so-called parison such as tubular extrusion 40 there between and removal of a molded article upon completion of a blow molding operation. In the closed position, mating mold components 12 and 22 abut at parting plane 50, the abutting and opposed faces of mating mold components 12 and 22 having molding surfaces thereon defining at least one cavity for defining the shape and size of an article to be blow molded. Tubular extrusion 40 is formed as a single continuous tubular extrusion and extends below the lowest molding surface of the cavity created with abutment of mating mold components 12 and 22. With mold assembly 10 closed, a blow moldable perform is created by closing the lower end of tubular extrusion 40 while leaving the upper end open for admission of pressurized fluid to expand the preform material to abut the molding surfaces of the cavity.

Continuing with reference to FIG. 2, each mold half comprises a neck insert block such as neck insert blocks 20 and 21 for receiving a neck insert mold component such as neck insert mold components 42 and 43. Neck insert mold components 42 and 43 comprise molding surfaces that create closure retention surface features on the exterior of the neck of a container such as neck 7 of the container of FIG. 1. As seen in FIG. 2, each neck insert mold component is held in place in its associated neck insert block by clamping devices such as clamping mechanisms 70, 71, 72 and 73. Clamping mechanisms 70, 71, 72 and 73 are manually operable between closed (clamping) and open (release) conditions to allow neck insert mold components 42 and 43 to be removed from and installed in neck insert blocks 20 and 21, respectively. FIG. 2 illustrates the closed condition of manually operable clamping mechanisms 70, 71, 72 and 73.

Figure 3:
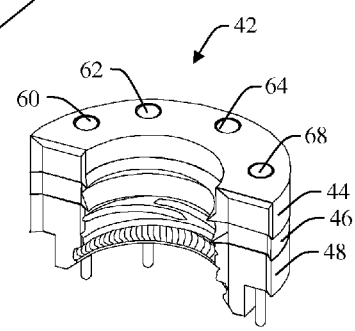
FIG. 3 illustrates a neck insert mold component of the mold assembly of FIG. 2

FIG. 3 illustrates details of a neck insert mold component such as neck insert mold component 42. As is conventional, each neck insert mold component comprises three molding elements: (i) neck insert "master" member 44 effective to seal the interior of perform 40 when a nozzle is inserted in the open end thereof; (ii) sheer member 46; and. (iii) neck finish member 48. Shear member 46 is effective to separate the neck 7 from parison 40 on closure of mold assembly 10. The portion of parison 40 between shear member 46 and mold base blocks 14 and 24 (FIG. 2) constitutes a blow moldable preform having a closed end formed by abutment of base blocks 14 and 24 and an open end at neck insert mold components 42 and 43. Neck finish member 48 is shown with molding surfaces for forming threads on the exterior of neck 7 as would be used to engage mating threads on the interior of a closure element (not shown). Movement of the neck insert members of neck insert components 42 and 43 relative to each other and relative to neck insert blocks 20 and 21, respectively, is prevented by alignment pins such as alignment pins 60, 62, 64 and 68 passing through the neck insert members and into the associated neck insert block such as neck insert block 20. As seen in FIG. 3, recessed areas comprise the face ends of master member 44, shear member 46 and neck finish member 48 to allow room for the relatively large volume of material of parison 40 captured at the neck insert mold components when mating mold components 12 and 22 are brought into abutment.

Figure 4:
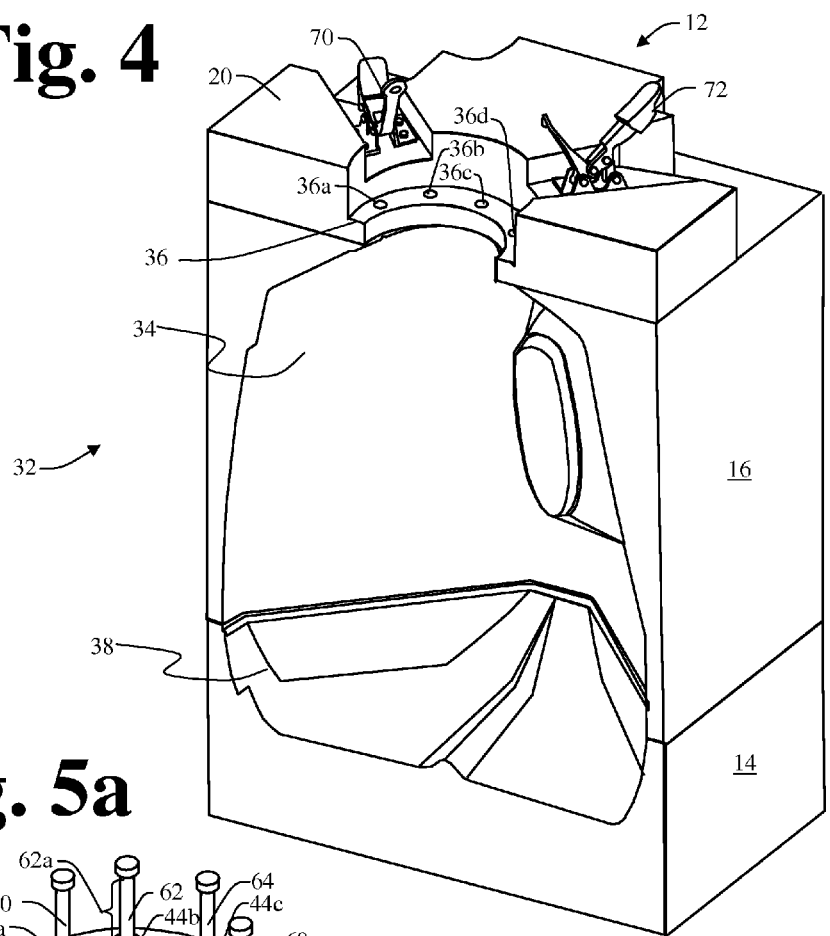
FIG. 4 illustrates a mating mold half of the mold assembly of FIG. 2 with the neck insert mold component removed

Further aspects of mating mold component 12 shall be described with reference to FIG. 4. In FIG. 4, neck insert mold component 42 has been removed and clamping mechanisms 70 and 72 are shown in their "open" or release condition. Step 36 in the face side of neck insert block 20 provides support surfaces for a neck insert mold component such as neck insert mold component 42. Through holes, such as through holes 36a, 36b, 36c and 36d receive the ends of alignment pins 60, 62, 64 and 68, respectively, that project below neck insert mold component 42. With neck insert mold component 42 seated at step 36, alignment pins 60, 62, 64 and 68 prevent horizontal translation and rotation of neck insert mold component 42 relative to neck insert block 20. Mold half 12 comprises molding surfaces defining portion 32 of the cavity created by abutment of mating mold components 12 and 22. In addition to the molding surfaces of neck insert mold component 42, cavity portion 32 comprises molding surfaces 34 that define the body of a container such as body 8 of the container of FIG. 1; and, molding surfaces 38 that define the base portion of a container such as base 4 of the container of FIG. 1. In addition to neck insert block 20, mating mold component 12 comprises center section 16 comprising molding surfaces 34 and base block 14 comprising molding surfaces 38. Neck insert block 20 is attached to mold component 12 by fasteners (not shown). The corresponding sections of mating mold component 22 are center section 26, base block 24 and neck insert block 21. Mating mold component 22 comprises molding surfaces substantially mirroring molding surfaces 34 and 38 of mating mold component 12 and neck insert mold component 43 includes elements comprising features including molding surfaces substantially mirroring elements of neck insert mold component 42. With mating mold components 12 and 22 abutting, the molding surfaces of base blocks 14 and 24, center sections 16 and 26, and neck insert mold components 42 and 43 define a complete cavity of mold assembly 10.

Figure 5A:
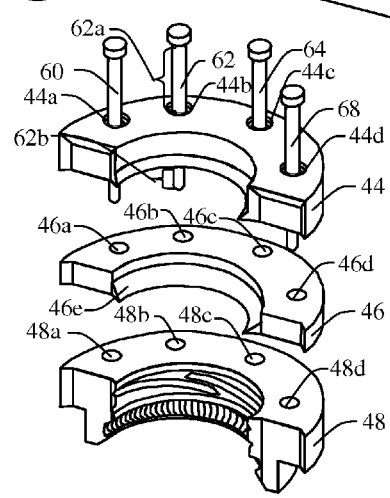
FIGS. 5a and 5b illustrate details of a neck insert mold component and its location in a neck insert block of the mold assembly of FIG. 2
Figure 5B:
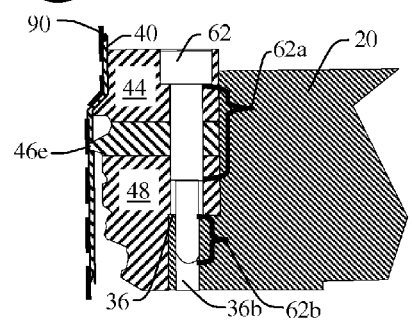

As described with reference to FIG. 3, each neck insert mold component comprises a neck finish member, such as neck finish member 48, a shear member, such as shear member 46 and a master member, such as master member 44. Stacking and alignment of members of neck insert mold components such as neck insert mold component 42 shall be described with reference to FIGS. 5a and 5b. Referring to FIG. 5a, members of neck insert mold component 42 are shown spaced apart to reveal through holes of each component. In particular, through holes 44a, 44b, 44c and 44d of neck master component 44 comprise counter-bores and are shown with alignment pins 60, 62, 64 and 68 partially inserted therein. Through holes 46a, 46b, 46c and 46d of shear member 46 are shown spatially in line with through holes of neck master member 44 and through holes 48a, 48b, 48c and 48d are likewise shown spatially in line with through holes of shear member 46. FIG. 5b illustrates a partial cross section of members of a neck insert mold component when in place in a neck insert block together with a partial cross section of a portion of parison 40. As seen in FIG. 5b, neck insert mold component members such as neck master member 44, shear member 46 and neck finish member 48 are stacked one atop the other and seated on step 36 of neck insert block 20. As illustrated by alignment pin 62, when seated in the counter-bores of through holes of neck master component 44, the alignment pins project into a through hole of neck insert block 20, such as through hole 36b, but do not extend through neck insert block 20. Alignment of members of neck insert mold component 42 to one another is effected by contact of the sides of spatially in line through holes thereof with the enlarged barrel segments of the associated alignment pins as illustrated by contact of the sides of through holes 44b, 46b, and 48b with enlarged barrel segment 62a of alignment pin 62. Alignment of the stack of members of neck insert mold component 42 with neck insert block 20 is effected by contact of the end segments of the alignment pin shanks with the sides of through holes of the insert block as illustrated by contact of end segment 62b of alignment pin 62 with sides of through hole 36b of insert block 20.

Shear member 46 of neck insert mold component 42 is effective to part a tubular parison such as parison 40 of FIG. 2. To that end, shear member 46 comprises a circumferential projecting edge 46e. With mating mold components abutted, the circumferential projecting edges of the opposed shear members form a circle of a diameter substantially the same as the outside diameter of a so-called "blow pin" inserted into the open end of parison 40. In FIG. 5b, the profile of blow pin 90 is illustrated by a dashed line abutting the interior of parison 40. Parison 40 is parted by contact between blow pin 90 and the projecting edges of shear members, such as projecting edge 46e. An enlarged portion of blow pin 90 is effective to force parison 40 against master member 44 so as to seal the portion of parison 40 below master member 44 to allow pressurization of the interior of the perform defined by the portion of parison 40 below shear member 46.

Figure 6:
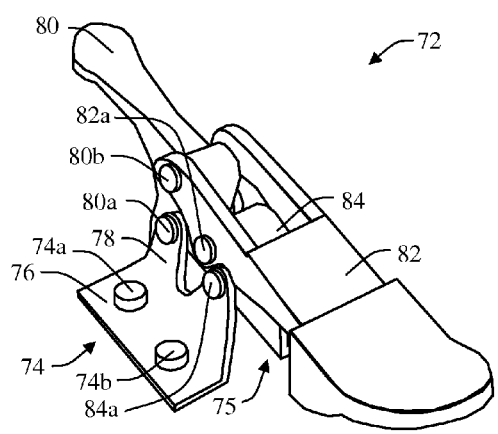
FIG. 6 is a perspective view of a clamping mechanism for retaining a neck insert mold component with the blow mold assembly of FIG. 2.

A manually operable retention device, such as clamp mechanism 72, suitable for retaining neck insert mold components 42 and 43 with mold assembly 10 as illustrated in FIG. 2 shall be described with reference to FIGS. 6, 7a and 7b. Clamp mechanism 72 comprises a pair of supports such as supports 74 and 75 each having a mounting flange such as mounting flange 76 of support 74 and support upright such as support upright 78 of support 74. Mounting flanges of each support pair are attached to the associated neck insert block by fasteners such as fasteners 74a and 74b. A clamp arm such as clamp arm 80 and a link such as link 84 are rotatably supported by the support uprights of each pair of supports. A lever arm such as lever arm 82 is rotatably connected to an end of the link away from the end rotatably supported by the support pair and is rotatably connected to the clamp arm at the end thereof proximate the support pair. A shank of axle 80a passes through the support uprights of the support pair and through the lower end of the rearmost portion of clamp arm 80 permitting rotation of clamp arm 80 relative to the support pair. A shank of axle 84a passes through the support uprights of the support pair and through the rearward end of link 84 (see cross section of FIGS. 7a and 7b) so as to allow rotation of link 84 relative to the support pair. A shank of axle 82a passes through lever arm 82 between its forward and rearward ends and through the forward end of link 84 so as to allow rotation of lever arm 82 relative to link 84. A shank of axle 80b passes through the forward end of lever arm 82 and the upper end of the rearmost portion of clamp arm 80 to allow rotation of clamp arm 80 relative to lever arm 82. The arrangement of clamp arm 80, lever arm 82 and link 84 creates a so-called "toggle mechanism" whereby rotation and translation of lever arm 82 is effective to rotate clamp arm 80. Clamp arm 80 comprises a contact button 80c attached to the forward end of clamp arm 80 for contact with a neck insert mold component. Contact button 80c makes contact with the top surface of a neck insert mold component when clamp mechanism 72 is in the "clamp" configuration, that is, clamp arm 80 is rotated to the clamp position and a neck insert mold component is in place in neck insert block 20.

Figure 7A:
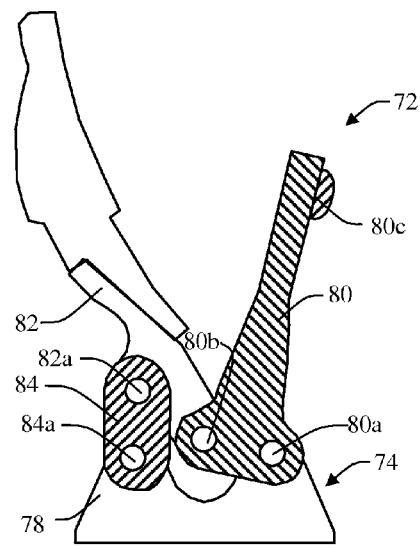
FIGS. 7a and 7b are partial cross section views of the clamping mechanism of FIG. 6 illustrating the release and clamping configurations thereof.
Figure 7B:
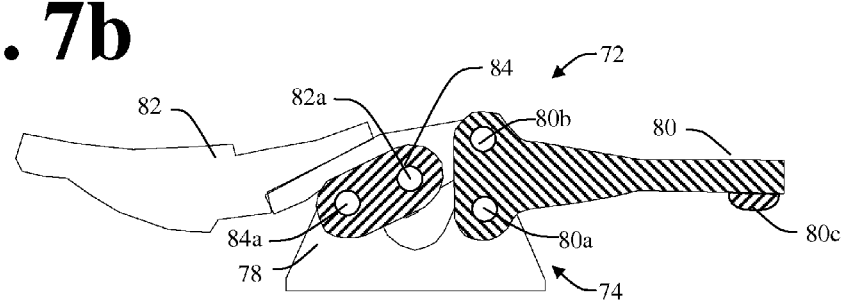

Continuing with reference to FIG. 7a, the release position of clamp arm 80 is illustrated where lever arm 82 is shown rotated to elevate the rearward end thereof and translate lever arm rearwardly (away from axle 80a) relative to the support pair. Rearward translation of lever arm 82 is a consequence of the connection thereof with link 84 and with clamp arm 80 and the rotatable connection of link 84 and clamp arm 80 with supports 74 and 75. As lever arm 82 is rotated towards clamp arm 80, each of link 84 and clamp arm 80 pivot relative to supports 74 and 75 and effect rearward translation of lever arm 82. The clamp position of clamp arm 80 is illustrated in FIG. 7b where lever arm 82 and clamp arm 80 are shown substantially horizontal and link 84 is at its lowest angle of inclination. From the release configuration of FIG. 7a, rotation of lever arm 82 away from clamp arm 80 results in forward translation of lever arm 82 in consequence of connection with link 84 and clamp arm 80. With rotation and translation of lever arm 82 to the position shown in FIG. 7b, clamp arm 80 is rotated to the clamp position. As shown in FIG. 7b, in the clamp configuration lever arm 82 and link 84 are in linear alignment resulting in compression acting along the lengths of link 84 and lever arm 82. In that configuration, force acting on clamp arm 80 at contact button 80c that would tend to rotate clamp arm 80 around axle 80a towards lever arm 82 is resisted by the compressive forces acting on link 84 and lever arm 82. Hence, in the clamp configuration, neck insert mold component 42 is clamped against neck insert block 20 by clamp mechanism 72.

In use, removal and installation of neck mold insert components 42 and 43 is achieved by setting clamping mechanisms 70, 72, 71 and 73 to their release configuration illustrated in FIG. 7a by manual rotation of the associated lever arms towards the associated clamp arms. With the clamping mechanisms in the release configuration, the associated clamp arms are sufficiently vertically disposed so as to allow neck insert mold components 42 and 43 to be removed from or installed into respective neck insert blocks 20 and 21. With neck insert mold components 42 and 43 in place in neck insert blocks 20 and 21, clamping mechanisms 70, 71, 72 and 73 are placed in their clamp configurations by rotating the respective lever arms thereof to be substantially horizontal as shown in FIG. 7b. Clamping mechanisms 70, 71, 72 and 73 are constructed to be configured by application of force solely to the associated lever arms by hand and without resort to tools. By elimination of fasteners as known for securing neck insert mold components, time required to remove and install such mold components is greatly reduced.

What is claimed is:

1. A blow mold assembly comprising:
opposed mating mold components for production of containers, wherein exterior surface features of a portion of each container that engages a removable container closure are formed from contact of a tubular preform with mold surfaces of the blow mold assembly, each mating mold component comprising,
   a removable neck insert mold component comprising at least one member for forming, at least in part, container closure engaging features of the container, and,
   at least one manually operable retention device for retaining the neck insert mold component with the mating mold component, wherein the manually operable retention device comprises a clamp mechanism that remains fixed to the mating mold component when the neck insert mold component is removed from or installed in the mold assembly, and
wherein each of the opposing mating mold components has a mold surface for forming, at least in part, a body of the container.

2. A blow mold assembly comprising:
opposed mating mold components for production of containers, wherein exterior surface features of a portion of each container that engages a removable container closure are formed from contact of a tubular preform with mold surfaces of the blow mold assembly, each mating mold component comprising,
   a removable neck insert mold component comprising at least one member for forming, at least in part, container closure engaging features of the container,
   at least one manually operable retention device for retaining the neck insert mold component with the mating mold component, wherein the manually operable retention device comprises a clamp mechanism that remains fixed to the mating mold component when the neck insert mold component is removed from or installed in the mold assembly, and
   a neck insert block attached to the mating mold component,
wherein the removable neck insert mold components are retained in the neck insert blocks by the manually operable retention devices.

3. The mold assembly according to claim 1, wherein the clamp mechanism comprises a toggle mechanism comprising a clamp arm, a manually operable lever arm, and a link arranged so that the clamp arm is rotated between a release position and a clamp position by manual operation of the lever arm and when the clamp arm is in the clamp position the toggle mechanism is effective to resist forces applied to the clamp arm in a direction to rotate the clamp arm toward the release position.

4. A blow mold assembly comprising:
opposed mating mold components for production of containers, wherein exterior surface features of a portion of each container that engages a removable container closure are formed from contact of a tubular preform with mold surfaces of the blow mold assembly, each mating mold component comprising,
   a removable neck insert mold component comprising at least one member for forming, at least in part, container closure engaging features of the container,
   at least one manually operable retention device for retaining the neck insert mold component with the mating mold component, wherein the manually operable retention device comprises a clamp mechanism that remains fixed to the mating mold component when the neck insert mold component is removed from or installed in the mold assembly,
wherein the tubular preform is formed from a tubular parison extending through the mold assembly in an open position from above the mating mold components, and each removable neck insert mold component comprises a shear member comprising a projecting circumferential edge so that with the mold assembly in a closed position, the opposed shear members are effective for parting the tubular parison at the projecting circumferential edges thereof so as to define a preform from the portion of the parison below the opposed shear members.

5. The mold assembly according to claim 4, wherein each removable neck insert mold component comprises a neck finish member comprising neck finish defining surface features, the shear member and the neck finish member being arranged so that the tubular parison is parted above the neck finish member when the mold assembly is closed.

6. The mold assembly according to claim 5, wherein each removable neck insert mold component further comprises two or more pins passing through the shear member and the neck finish member for aligning the neck finish member relative to the shear member.

7. The mold assembly according to claim 6, further comprising:
   a neck insert block attached to each of the mating mold components,
   wherein each neck insert block comprises a step on which its respective neck insert mold component is seated, and wherein the pins project into holes in the step of the neck insert block and are effective to align the neck insert mold component with the neck insert block.

8. The mold assembly according to claim 4, wherein each removable neck insert mold component comprises a master member effective for sealing the preform against a blow pin to allow pressurization of the preform.

9. The mold assembly according to claim 8, wherein each removable neck insert mold component further comprises two or more pins passing through the master member, the shear member and the neck finish member for aligning the neck finish member relative to the shear member and the shear member relative to the master member.

10. The mold assembly according to claim 9, further comprising:
   a neck insert block attached to each of the mating mold components,
   wherein each neck insert block comprises a step on which its respective neck insert mold component is removably seated, and wherein the pins project into holes in the step of the neck insert block and are effective to align the neck insert mold component with the neck insert block.

* * * * *